United States Patent [19]
LaNieve, III et al.

[11] Patent Number: 4,707,525
[45] Date of Patent: Nov. 17, 1987

[54] OXYMETHYLENE POLYMER MOLDING COMPOSITIONS HAVING ENHANCED IMPACT RESISTANCE AND ARTICLE MOLDED THEREFROM

[75] Inventors: H. Leslie LaNieve, III, Warren, N.J.; Robert S. Drzal, Naugatuck; Benjamin S. Ehrlich, Cheshire, both of Conn.

[73] Assignee: Celanese Corporation, New York, N.Y.

[21] Appl. No.: 930,989

[22] Filed: Nov. 14, 1986

Related U.S. Application Data

[63] Continuation of Ser. No. 797,800, Nov. 15, 1985, abandoned, which is a continuation of Ser. No. 625,954, Jun. 29, 1984, abandoned.

[51] Int. Cl.$^4$ .................. C08G 60/00; C08G 63/76
[52] U.S. Cl. .................................. 525/399; 525/410
[58] Field of Search ............................. 525/399, 410

[56] References Cited

U.S. PATENT DOCUMENTS

| | | | |
|---|---|---|---|
| 3,027,352 | 3/1962 | Walling et al. | 260/67 |
| 3,133,896 | 5/1964 | Dolce et al. | 260/45.85 |
| 3,493,634 | 2/1970 | Kolycheck | 260/858 |
| 3,642,964 | 2/1972 | Rausch, Jr. et al. | 264/40 |
| 3,850,873 | 11/1974 | Wurmb et al. | 525/410 |
| 4,169,196 | 9/1979 | Ehrlich et al. | 528/58 |
| 4,202,957 | 5/1980 | Bonk et al. | 528/77 |
| 4,277,577 | 7/1981 | Burg et al. | 525/131 |

FOREIGN PATENT DOCUMENTS

| | | |
|---|---|---|
| 0038881 | 11/1981 | European Pat. Off. . |
| 0116456 | 8/1984 | European Pat. Off. . |
| 0117664 | 9/1984 | European Pat. Off. . |
| 0121407 | 10/1984 | European Pat. Off. . |
| 1017244 | 1/1966 | United Kingdom ............. 525/399 |

*Primary Examiner*—Lewis T. Jacobs
*Assistant Examiner*—A. Carrillo
*Attorney, Agent, or Firm*—Burns, Doane, Swecker & Mathis

[57] ABSTRACT

Articles molded from oxymethylene polymer molding compositions of the present invention exhibit enhanced impact strength properties, especially at low temperatures such as $-20°$ F. It has now been found that the impact strength of articles molded from oxymethylene polymer molding compositions may be improved when the compositions include an elastomeric polyurethane, which is the reaction product of:

(i) 4,4'-methylenebis(phenyl isocyanate),
(ii) polyoxytetramethylene glycol having a molecular weight within the range of about 1500 to about 3000, and
(iii) at least one diol extender selected from the group consisting of aliphatic straight chain diols having from 2 to about 6 carbon atoms, bis(2-hydroxyethyl) ether of hydroquinone, and bis(2-hydroxyethyl) ether of resorcinol.

21 Claims, No Drawings

OXYMETHYLENE POLYMER MOLDING COMPOSITIONS HAVING ENHANCED IMPACT RESISTANCE AND ARTICLE MOLDED THEREFROM

This application is a continuation of application Ser. No. 797,800, filed Nov. 15, 1985, now abandoned, which is a continuation of application Ser. No. 625,954, filed June 29, 1984, now abandoned.

BACKGROUND OF THE INVENTION

The present invention relates to oxymethylene polymer molding compositions. More particularly, the present invention relates to oxymethylene copolymer molding compositions that contain a certain elastomeric polyurethane, and which may be molded into articles having enhanced impact strength properties.

Oxymethylene polymers, having recurring —CH$_2$O— units have been known for many years. They may be prepared by the polymerization of anhydrous formaldehyde or by the polymerization of trioxane which is a cyclic trimer of formaldehyde.

The usefulness of oxymethylene polymers in molding compositions has also been known for years. For example, U.S. Pat. No. 3,275,604 discloses a moldable oxymethylene copolymer comprising oxymethylene groups and oxyethylene groups, with said oxyethylene groups having a —CH$_2$OR group pendant therefrom, which may be prepared by polymerizing a source of oxymethylene units such as trioxane with a glycidyl ether.

For certain molding applications, e.g., exterior automobile body parts, molding compositions that impart good impact strength to articles molded therefrom are highly desirable. It is not enough, however, that the molded objects exhibit improved impact strengths at room temperature and above, but for many uses they must also retain enhanced impact properties at temperatures as low as −20° F. and lower. For example, low temperature impact retention is especially important when the molded objects are to be used or are frequently present outdoors. Furthermore, it is important that the addition of the impact modifier to the oxymethylene composition not reduce the flexural modulus of the resulting molded articles to unacceptable values. In short, what is needed is an impact modified oxymethylene composition that can be molded into articles that have enhanced impact strengths at both room temperatures and low temperatures (such as −20° F. and lower), and retain commercially useful flexural modulus values.

Accordingly, it is an object of the present invention to provide an oxymethylene polymer molding composition that may be molded into articles which exhibit enhanced impact strength.

It is another object of the present invention to provide an oxymethylene polymer molding composition that may be molded into articles which exhibit enhanced impact strength and which retain enhanced impact strength value at temperatures as low as −20° F.

It is stell another object of the present invention that the articles molded from the impact modified oxymethylene compositon have useful flexural modulue values.

These and other objects, as well as the scope, nature, and utilization of the present invention, will be apparent to those skilled in the art from the following description and appended claims.

SUMMARY OF THE INVENTION

In accordance with the present invention, an oxymethylene polymer molding composition which is capable of being molded to form articles exhibiting enhanced impact strength comprises an intimate blend of:

(a) from about 5 to about 50 weight percent based upon the total weight of the composition of an elastomeric polyurethane, which is the reaction product of:
  (i) 4,4′-methylenebis(phenyl isocyanate),
  (ii) polyoxytetramethylene glycol having a molecular weight within the range of about 1500 to about 3000, and
  (iii) at least one diol extender selected from the group consisting of aliphatic straight chain diols having from 2 to about 6 carbon atoms, bis(2-hydroxyethyl) ether of hydroquinone, and bis(2-hydroxyethyl) ether of resorcinol, and (b) from about 50 to about 95 weight percent based upon the total weight of the composition of an oxymethylene polymer.

In addition, the diol extender is used in the polyurethane reaction within the amount of about 0.5 to about 2.5 equivalents of extender per equivalent of said polyoxytetramethylene glycol, and the phenyl isocyanate is used in the reaction in an amount such that the ratio of isocyanate groups to total hydroxyl groups (that is, glycol plus diol extender) is within the range of about 1.0: 1.0 to about 1.08: 1.0.

DESCRIPTION OF PREFERRED EMBODIMENTS

OXYMETHYLENE POLYMER

The oxymethylene polymer used in the molding composition of the present invention is well known in the art. The polymers are characterized as having recurring oxymethylene groups or units, i.e., —CH$_2$O—. The term oxymethylene polymer as used herein is intended to include any oxymethylene polymer having —CH$_2$O— groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Ser. No. 691,143, filed Oct. 21, 1957, now U.S. Pat. No. 2,989,506, by Hudg Berardinelli.

The homopolymers are usually stabilized against thermal degradation by end-capping or the incorporation therein of stabilizer compounds such as described in U.S. Pat. No. 3,133,896 to Dolce and Berardinelli.

Oxymethylene polymers that are particularly adapted for use in the molding compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) —OCH₂—groups interspersed with (b) groups represented by the general formula:

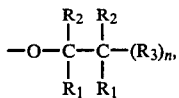

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH₂—units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g., $BF_3$, $PF_5$, and the like) or other acids (e.g., $HCl_4$, 1% $H_2SO_4$, and the like).

In general, the cyclic ethers employed in making the preferred oxymethylene copolymers are those represented by the general formula:

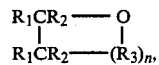

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

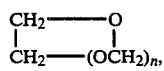

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably present in the molding compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the molding composition of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in U.S. Pat. No. 3,219,623 to Berardinelli.

If desired, the oxymethylene copolymer may be end-capped by techniques known to those skilled in the art. A preferred end-capping technique is accomplished by acetylation with acetic anhydride in the presence of sodium acetate catalyst. A preferred oxymethylene copolymer is commercially available from Celanese Corporation under the designation CELCONR ® acetal copolymer, and especially preferred is CELCON ® M25 which has a melt index of about 2.5g./10 min. when tested in accordance with ASTM D1238-82.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

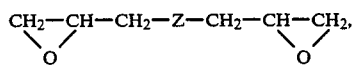

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butane-diol, cyclobutane-1,3-diol, 1,2-propane-diol, cyclohexane-1, 4-diol and 2-dimethyl-4-dimethyl-cyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer.

The trioxane-based terpolymer polymerization is advantageously carried out at temperatures at which trioxane does not crystallize out, that is, at a temperature within the range of −50° C. to +100° C., depending on the solvent used, and in the absence of a solvent at a temperature within the range of +20° C. to +100° C.

As trioxane-based terpolymer polymerization catalysts, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent.

Since the catalysts tend to decompose the terpolymer, the catalyst is advantageously neutralized immediately after the polymerization, for example, with ammonia or methanolic or acetonic amine solutions.

The unstable terminal hemiacetal groups may be removed from the terpolymer in the same manner as known for other oxymethylene polymers. Advantageously, the terpolymer is suspended in aqueous ammonia at temperatures within the range of 100° C. to 200° C., and if desired, in the presence of a swelling agent such as methanol or n-propanol. Alternatively, the terpolymer is dissolved in an alkaline medium at temperatures above 100° C. and subsequently reprecipitated. Examples of suitable solvents are benzyl alcohol, ethylene glycol monoethyl ether or a mixture of 60 weight percent methanol and 40 weight percent water. Examples of suitable compounds having an alkaline reaction are ammonia and aliphatic amines.

It is also possible to thermally stabilize the terminal groups of the terpolymers in the absence of a solvent in the melt in the presence of a stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° C. to 250° C. for a specified period of time, and then washed with water and dried or centrifuged.

A preferred oxymethylene terpolymer is commercially available from Celanese Corporation under the designation U10, and is a butanediol diglycidyl ether-/ethylene oxide/trioxane terpolymer containing about 0.05 weight percent, 2.0 weight percent, and 97.95 weight percent of each component, respectively.

It is within the ambit of the present invention to use oxymethylene polymers that include, if desired, plasticizers, formaldehyde scavengers, mold lubricants, antioxidants, fillers, colorants, reinforcing agents, light stabilizers, pigments, other stabilizers, and the like, so long as such additives do not materially affect the desired properties including enhancement of impact strength of the resulting molding composition and the articles molded therefrom.

Suitable formaldehyde scavengers include cyanoguanidine, melamines, polyamides, amine-substituted triazines, amidines, ureas, hydroxyl salts of calcium, magnesium, and the like, salts of carboxylic acids, and metal oxides and hydroxides. Cyanoguanidine is the preferred formaldehyde scavenger. Suitable mold lubricants include alkylene bisstearamide, long-chain amides, waxes, oils, and polyether glycides. The preferred mold lubricant is commercially available from Glyco Chemical, Inc. under the designation Acrawax C and is alkylene bisstearamide. The preferred antioxidants are hindered bisphenols. Especially preferred is 1,6-hexamethylene bis-(3,5-di-t-butyl-4-hydroxyhydrocinnamate), commercially available from Ciba-Geigy Corp. under the designation Irganox 259.

A most preferred oxymethylene copolymer for use in the present invention is commercially available from Celanese Corporation under the designation CELCON® M25-04. This oxymethylene copolymer has a melt index of about 2.5g./10 min. and contains 0.5 percent by weight Irganox 259, 0.1 percent by weight cyanoguanidine, and 0.2 percent by weight Acrawax C.

A most preferred oxymethylene terpolymer is commercially available from Celanese Corporation under the designation U10-11. U10-11 is the previously mentioned U-10 terpolymer stabilized by 0.5 percent by weight Irganox 259 and 0.1 percent by weight calcium ricinoleate.

ELASTOMERIC POLYURETHANE

The elastomeric polyurethane used in the molding composition of the present invention is the reaction product of:

(i) 4,4'-methylenebis(phenyl isocyanate),
(ii) polyoxytetramethylene glycol having a molecular weight within the range of about 1500 to about 3000, and
(iii) a diol extender selected from the group consisting of aliphatic straight chain diols having from 2 to about 6 carbon atoms, bis(2-hydroxy-ethyl) ether of hydroquinone, bis(2-hydroxy-ethyl) ether of resorcinol, and mixtures of any two or more of such diol extenders.

Preferably, the polyoxytetramethylene glycol has a molecular weight within the range of about 2000 to about 2900. The molecular weight of the polyoxytetramethylene glycol as used herein is a number average molecular weight. In addition to using polyoxytetramethylene glycols within the specified molecular weight ranges, it is also within the scope of the present invention to blend lower or higher molecular weight polyoxytetramethylene glycols with other molecular weight polyoxytetramethylene glycols so that the molecular weight of the final blend is within the above specified molecular weight ranges.

The term "aliphatic straight chain diols having from 2 to about 6 carbon atoms" means diols of the formula $HO(CH_2)_nOH$ wherein n is 2 to about 6 and there is no branching in the aliphatic chain separating the OH groups. The term is inclusive of ethylene glycol, 1,3-propanediol, 1,4-butanediol, 1,5-pentanediol and 1,6-hexanediol.

The preferred diol extenders are 1,4-butanediol, 1,6-hexanediol and the bis(2-hydroxy-ethyl) ether of hydroquinone; the most preferred diol extender being 1,4-butanediol.

The polyoxytetramethylene glycol and diol extender are used in the polyurethane reaction medium in a ratio of about 0.5 to about 2.5 equivalents (e.g., mole equivalents) of the diol extender per equivalent of the glycol. Preferably, the equivalents ratio is from about 1 to about 2. Most preferably the ratio is from about 1.2 to about 1.6 equivalents of diol extender per equivalent of the glycol when the polyoxytetramethylene glycol has a molecular weight of about 2000, and especially when the diol extender is an aliphatic straight chain diol. When the hydroquinone or resorcinol extender are used, the equivalents ratio may be lower than the above-mentioned preferred ranges, for example, as low as about 0.5 equivalents of the extender per equivalent of the glycol.

Regardless of the particular polyurethane reaction method which is chosen, the hydroxyl components (i.e., the polyoxytetramethylene glycol and the diol extender) and the diisocyanate are used such that the overall ratio of isocyanate equivalents or groups to total hydroxyl equivalents or groups (glycol plus diol extender) is within the range of about 1:1 to about 1.08:1.0, and preferably is within the range of about 1.02:1.0 to about 1.07:1.0. The most preferred ratio of isocyanate (NCO) groups to total hydroxyl (OH) groups is within the range of from about 1.03:1.0 to about 1.06:1.0.

The term equivalent(s) as used with respect to the polyurethane preparation in the present specification and claims is based on the hydroxyl and isocyanate groups of the reactants.

The thermoplastic polyurethane elastomers of the present invention can be prepared by processes which are conventional in the art for the synthesis of polyurethane elastomers. Illustrative of such processes are those described in U.S. Pat. Nos. 3,493,634; 4,169,196; 4,202,957; and 3,642,964. Such processes include the one-shot procedure in which all the reactants are brought together simultaneously, and the prepolymer procedure in which the isocyanate is reacted with the polyoxytetramethylene glycol in a first-step and the isocyanate-terminated prepolymer so produced is subsequently reacted with the diol extender. The one-shot process also includes the process in which the diisocyanate has been converted to a quasi-prepolymer by reaction with a very minor amount (i.e., less than about 10 percent on an equivalent basis) of the glycol prior to carrying out the polyurethane forming reaction. The one-shot is the preferred procedure for preparing the elastomeric polyurethanes of the present invention. In a most preferred embodiment, the elastomeric polyurethanes of the present invention are prepared by a continuous one-shot procedure such as that set forth in U.S. Pat. No. 3,642,964.

In the one-shot procedures (including continuous one-shot procedure) the reactants are brought together in any order. Advantageously, the polyoxytetramethylene glycol and the diol extender are preblended and fed to the reaction zone as a single component, the other major component being the diisocyanate (or quasi-prepolymer where used). The mixing and reaction of the reactants can be accomplished by any of the procedures and apparatus conventional in the art. Preferably, the individual components or reactants are rendered substantially free from the presence of extraneous moisture using conventional procedures, for example, by azeotropic distillation using benzene, toluene, and the like, or by heating under reduced pressure at a temperature above the boiling point of water at the pressure employed. As is well known by those skilled in the art, water will interfere with the polyurethane reaction by reacting with the diisocyanate and the resulting polyurethane. Thus, moisture levels as low as practical are desired, typically well below 0.1 percent by weight of the total reactants, and more preferably below 0.05 weight percent and even lower.

Advantageously, in a one-shot batch procedure, the heated hydroxyl components either alone or preferably together, are subjected to degassing in order to remove residual moisture, entrained bubbles of air or other gases before the polyurethane reaction takes place. This degassing is accomplished conveniently by reducing the pressure under which the components are maintained until no further evolution of bubbles occurs. Typically, such degassing takes from about 1 to about 3 hours at about 85° C. to about 110° C. The hydroxyl components are preferably stirred during degassing. The degassed hydroxyl components are then admixed with the diisocyanate (or quasi-prepolymer where used), which is typically at about 60° C. The resulting degassed mixture is then reacted, with stirring, to form the elastomeric polyurethane. The polyurethane reaction is exothermic. Reaction temperatures typically range from about 80° C. to about 200° C. or higher.

The resulting polyurethane is then transferred to suitable molds or extrusion equipment or the like and cured at a temperature on the order of about 20° C. to about 115° C. The time required for curing will vary with the temperature of curing and also with the nature of the particular composition. The time required in any given case can be determined by a process of trial and error. Typically, the polyurethanes of the present invention may be cured at about 100° C. for about 1 hour and at about 20° C. to about 23° C. for 24 hours when a one-shot batch procedure is used.

It is frequently desirable but not essential to include a catalyst in the reaction mixture employed to prepare the polyurethane compositions of the present invention. Any of the catalysts conventionally employed in the art to catalyze the reaction of an isocyanate with a reactive hydrogen containing compound can be employed for this purpose; see, for example, Saunders et al, Polyurethanes, Chemistry and Technology, Part I, Interscience, New York, 1963, pages 228–232; see also Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin diluarate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.002 to about 2.0 percent by weight based on the total weight of the polyurethane reactants.

When the elastomeric polyurethane compositions of the present invention are prepared by the less preferred prepolymer method, the diisocyanate and the polyoxytetramethylene glycol (in whole or in part) are reacted, if desired, in the presence of a catalyst as defined above, in a preliminary stage to form an isocyanate-terminated prepolymer. The proportions of diisocyanate and glycol employed in the preparation of this prepolymer are consistent with the ranges defined above. The diisocyanate and the glycol are preferably rendered substantially free from the presence of extraneous moisture, using the methods described above, before the formation of the prepolymer is carried out. The formation of the prepolymer is advantageously carried out at a temperature within the range of about 70° C. to about 130° C. under an inert atmosphere such as nitrogen gas in accordance with conventional procedures. The prepolymer so formed can then be reacted at any desired time, with the extender diol (and the balance, if any, of polyoxytetramethylene glycol not reacted with the diisocyanate in the first stage) to form the polyurethane elastomers of the present invention. This reaction is carried out advantageously within the range of reaction temperatures specified above for the one-shot procedure. In general, the prepolymer and the diol extender (preferably degassed as described above) are mixed and heated within the requisite temperature range and then transferred to suitable molds, extrusion apparatus, or the like, and cured as described above for the one-shot procedure.

If desired, the polyurethane elastomers of the present invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers. An especially preferred polyurethane elastomer for use in the oxymethylene molding compositions of the present invention is prepared by reacting 1.0 equivalent of polyoxytetramethylene glycol having a molecular weight of about 2000 with 1.5 equivalents of 1,4-butanediol and 2.63 equivalents of 4,4'-methylenebis(phenyl isocyanate). The above polyurethane is admixed with 0.25 percent by weight of Advawax 280, an N,N'-ethylene bisstearmide (lubricant) sold commercially by Cincinnati Milacron Chemicals, Inc., and 0.25 percent by weight of Irganox 1010, a tetrakis [methylene 3-(3', 5'-di-tert-butyl-4'-hydroxyphenyl) propionate] methane (antioxidant) sold commercially by Ciba-Geigy Corp. The weight percent of the additives are based on the total weight of the polyurethane reactants.

The elastomeric polyurethanes of the present invention are further characterized by a Clash-Berg modulus ($T_f$) which is less than about $-40°$ C. and preferably a $T_f$ of less than about $-60°$ C. The Tg (glass transition temperature) of the polyurethanes is essentially the same value. The preferred polyurethanes of the present invention are also characterized by Shore A Hardness of 90A or less, and a weight average molecular weight in excess of 100,000.

PREPARATION OF MOLDING COMPOSITIONS OF THE PRESENT INVENTION

The oxymethylene polymer molding compositions of the present invention comprise from about 5 to about 50 weight percent, preferably from about 15 to about 50 weight percent, and most preferably from about 20 to about 40 weight percent of the elastomeric polyurethane. Correspondingly, from about 50 to about 95 weight percent, preferably from about 50 to about 85 weight percent, and most preferably from about 60 to about 80 weight percent of the oxymethylene polymer is present. The above weight percents are based on the total weight of the molding composition.

The molding compositions may suitably be prepared by any conventional procedure that will result in an intimate blend or mixture of the components. Preferably, dry or melt blending procedures and equipment are used. For example, the polyurethane (in the form of pellets, chips or granules) can be dry mixed with the oxymethylene polymer (in the form of pellets, chips, granules or powder) typically at room temperature, and the resulting mixture melt blended in any conventional type extrusion equipment, which is heated to a temperature of from about 180° C. to about 230° C., and preferably from about 185° C. to about 205° C.

Preferably, the polyurethane elastomer and oxymethylene polymer are dried (either alone or together) before being subjected to the intimate blending procedure. The drying can be done in desiccated air having a dew point of about $-30°$ C. to $-40°$ C. or lower, at a temperature of from about 70° C. to about 110° C., and preferably above 80° C. The drying can also be accomplished in a vacuum oven, for example, at a temperature above about 90° C. The drying time will depend primarily on the moisture content, drying temperature, and particular equipment employed, but typically is from about 2 to about 6 hours or more. If the drying is conducted for longer periods of time, such as overnight, the drying temperature should preferably be about 70° C. to about 85° C. In general, any conventional drying procedure can be used to reduce the moisture content to below about 0.1 weight percent, based on the total weight of the polyurethane and oxymethylene polymer, preferably below about 0.05 weight percent, and most preferably below about 0.01 weight percent or lower. As is well known to those skilled in the art, water will react with polyurethanes upon processing the polyurethanes at elevated temperatures.

The oxymethylene molding composition resulting from the intimate blending procedure is then comminuted mechanically, for example by chopping, pelletizing or grinding, into granules, pellets, chips, flakes or powders, and processed in the thermoplastic state, for example by injection molding or extrusion molding, into shaped articles, for example, bars, rods, plates, sheets, films, ribbons, tubes and the like.

Preferably, the comminuted oxymethylene molding composition is dried (as discussed above) prior to being molded.

Objects molded from the oxymethylene molding compositions of the present invention exhibit enhanced impact strength or resistance as measured by the Notched Izod impact test, when tested in accordance with ASTM method D256. When oxymethylene copolymers are used in the molding compositions, and especially oxymethylene copolymers having a melt index of about 2.5 g./10 min., the resulting molded objects have retained enhanced impact strength values to temperatures as low as −20° F. and lower and the molded objects even exhibit some ductility in a Gardner type impact test to temperatures as low as −40° F.

Because of this enhanced low temperature impact resistance such oxymethylene molding compositions can be used to form molded objects that will be subjected to use or storage outdoors such as automobile body parts, tool casings, and the like.

The following Examples are given as specific illustrations of the claimed invention. It should be understood, however, that the specific details set forth in the examples are merely illustrative and in no wise limitative. All parts and percentages in the Examples and the remainder of the specification are by weight of the total composition unless otherwise specified.

EXAMPLE 1

The oxymethylene polymer was a trioxane-ethylene oxide copolymer containing about 98 weight percent of recurring —$OCH_2$—groups and about 2 weight percent of comonomer units derived from ethylene oxide having the formula —$OCH_2CH_2$—. The oxymethylene copolymer was prepared as previously has been described herein and more specifically in the aforementioned U.S. Pat. No. 3,027,352 to Walling et al, and had been hydrolyzed to stabilize the ends of the polymer chains. The oxymethylene copolymer possessed a crystallinity of approximately 75 percent, a number average molecular weight of approximately 35,000, an inherent viscosity (I.V.) of approximately 1.3 (measured at 60° C. in a 0.1 weight percent solution in p-chlorophenol containing 2 weight percent of alphapinene), a melting temperature of 165° C., and a melt index of approximately 2.5 g./10 min. when tested in accordance with ASTM method D1238-82.

The oxymethylene copolymer also contained, as a stabilizer package, 0.5 percent by weight of Irganox 259, 0.1 percent by weight cyanoguanidine and 0.2 percent by weight Acrawax C. The above weight percents were based on the total weight of the oxymethylene copolymer plus stabilizer package.

Using the reactants shown in Table I below (reactant proportions shown in equivalents) a series of polyurethane elastomers were prepared using the following one-shot batch procedure.

Polyoxytetramethylene glycol (PTMG) was degassed by heating under reduced pressure at 100° C. for 1 hour. To the degassed PTMG was added 1,4-butanediol (1,4-BD) diol extender and the resulting mixture was degassed at 90° C. under reduced pressure for over one hour. The glycol and 1,4-BD were stirred during degassing. To the degassed hydroxyl group mixture, still at 90° C., was added 0.005 percent (based on the weight of total reactants, i.e., including the diisocyanate) of stannous octoate catalys followed by the addition of 4,4′-methylenebis(phenyl isocyanate) (MDI). The stannous octoate was added as a 50 percent by weight solution of stannous octoate in dioctylphthalate sold by M & T Chemicals under the trade designation T-10. The mixture so obtained was stirred until the viscosity increased sharply, which occurred in about 15 seconds, and then poured into a shallow aluminum tray. The poured elastomer and tray were allowed to stand at 100° C. for one hour and left at room temperature (about 20° C.) for 24 hours. Thereafter the elastomer was chopped into pieces, granulated and dried for 3 hours at 90° C.

A stabilizer-lubricant package of 0.25 weight percent Advawax 280 and 0.25 weight percent Irganox 1010 was mixed with the PTMG during degassing. The above stabilizer-lubricant weight percents were based on the weight of the total urethane reactants, i.e., the PTMG plus 1,4-BD plus MDI.

TABLE 1

| Polyurethane Elastomer | A | B | C | D | E | F | G | H |
|---|---|---|---|---|---|---|---|---|
| MDI | 2.04 | 2.08 | 2.34 | 2.58 | 2.68 | 3.0 | 3.09 | 3.09 |
| PTMG (M.W.* 2000) | 1.0 | 1.0 | 1.0 | 1.0 | 1.0 | 1.0 | 1.0 | — |
| PTMG (M.W. 2900) | — | — | — | — | — | — | — | 1.0 |
| 1,4-BD | 1.0 | 1.0 | 1.25 | 1.5 | 1.5 | 2.0 | 2.0 | 2.0 |
| NCO/OH | 1.02 | 1.04 | 1.04 | 1.03 | 1.07 | 1.00 | 1.03 | 1.03 |

*M.W. means number average molecular weight.

For purposes of comparison several additional polyurethane elastomers were prepared. The reactants and proportions (in equivalents) are set forth in Table 2 below. Elastomer (J) was prepared using the same one-shot batch procedure described above with respect to Table 1, but replacing the polyoxytetramethylene glycol there used by polybutylene adipate diol. Elastomer I was prepared by using a different polybutylene adipate diol. In addition, two elastomers (K and L) were prepared using PTMG having a number average molecular weight of only 1000. Elastomers (I, K, L and M) were prepared by using essentially the same procedure described with respect to Table 1, but carrying out the reaction on a continuous one-shot basis utilizing a Werner-Pfleiderer extruder-mixer, as in Example 2 below and pelletizing as in Example 2. The same stabilizer-lubricant package, as described above with respect to Table 1, in approximately the same weight percents was also included in each elastomer.

TABLE 2

| Polyurethane Elastomer | I | J | K | L | M* |
|---|---|---|---|---|---|
| MDI | 3.06 | 3.09 | 2.25 | 2.35 | 2.05 |
| PTMG (MW 1000) | — | — | 1.0 | 1.0 | — |
| PTMG (MW 2000) | — | — | — | — | 1.0 |
| Polybutylene adipate (MW 2000) | 1.0 | — | — | — | — |
| Polybutylene adipate (MW 2600) | — | 1.0 | — | — | — |
| 1,4-BD | 2.0 | 2.0 | 1.3 | 1.3 | 1.0 |
| NCO/OH | 1.02 | 1.03 | 0.98 | 1.02 | 1.0175 |

*Composition contained 0.012 equivalent of butyl carbitol, which further reduced the molecular weight of the resulting polyurethane as compared to the same composition without the butyl carbitol.

Aliquots of each of the polyurethane elastomers (Tables 1 and 2) were then dry mixed with the above described oxymethylene copolymer and the resulting mixture dried in a dehumidifying dryer (air dew point of −28.9° C.) at a temperature ranging from about 70° C. to about 93° C. for about 4 to 16 hours. Lower temperatures were used for the longer drying times. In each instance, 72 weight percent of the oxymethylene copolymer was used with 28 weight percent of the polyurethane; the weight percent being based on the total weight of the polyurethane and oxymethylene copolymer. Each resulting polyurethane-oxymethylene mixture was then melt blended in a 1" diameter single screw extruder at a temperature of about 190° C. for approximately 20 to 30 seconds, extruded into a strand and pelletized. Polyurethane elastomer K, prior to being mixed and melt blended with the oxymethylene copolymer, was processed in the single screw extruder under the same conditions described above, extruded into a strand and pelletized. The preextrusion of elastomer K further reduced its molecular weight.

The resulting polyurethane-oxymethylene copolymer pellets were again dried to reduce the moisture level to below about 0.03 weight percent and then molded in a 175 ton Reed Prentice injection molding machine to form bars of 5"×½"×¼" and ASTM D-638 T-bars for Notched Izod testing. Samples of ½"×⅛" were cut from the T-bars for the Notched Izod testing. Table 3 below sets forth relevant information concerning the blends and the Notched Izod impact test results obtained.

All Notched Izod impact test results set forth in the Examples 1 through 7 herein were obtained in accordance with ASTM method D 256.

| ELASTOMER COMPOSITION | |
|---|---|
| MDI | 2.63 (equivalents) |
| PTMG (MW 2000) | 1.0 (equivalents) |
| 1,4-BD | 1.5 (equivalents) |
| Advawax 280 | 0.25 wt. % (based on total-reactants) |
| Irganox 1010 | 0.25 wt. % (based on total reactants) |
| Stannous octoate | 0.025 wt. % (based on total reactants) |
| NCO/OH | 1.05 |
| PHYSICAL PROPERTIES | |
| Hardness, Shore A | 75 ± 5 |
| Specific gravity | 1.09 |
| Tensile Modulus: psi | |
| 100% | 700 |
| 300% | 1300 |
| Tensile strength: psi | 4500 |
| Tensile set: % | 25 |
| Elongation: % at break | 550 |
| Melt index, 190° C. 5 min. preheat, 8700 g | 1.0 g/10 min. |
| Tg (°C.) | about −65 |

EXAMPLE 3

Using the reactants and proportions (equivalents) set forth below (Table 4) three polyurethane elastomers

TABLE 3

| Corresponding polyurethane from Tables 1 and 2 | A | B | C | D | E | F | G | H | I | J | K | L | M*** |
|---|---|---|---|---|---|---|---|---|---|---|---|---|---|
| Oxymethylene Copolymer (wt. %) | 72 | 72 | 72 | 72 | 72 | 72 | 72 | 72 | 72 | 72 | 72 | 72 | 72 |
| Polyurethane (wt. %) | 28 | 28 | 28 | 28 | 28 | 28 | 28 | 28 | 28 | 28 | 28 | 28 | 28 |
| PTMG (1000) | — | — | — | — | — | — | — | — | — | — | 1.0 | 1.0 | — |
| *BA (2000) | — | — | — | — | — | — | — | — | 1.0 | — | — | — | — |
| PTMG (2000) | 1.0 | 1.0 | 1.0 | 1.0 | 1.0 | 1.0 | 1.0 | — | — | — | — | — | 1.0 |
| *BA (2600) | — | — | — | — | — | — | — | — | — | 1.0 | — | — | — |
| PTMG (2900) | — | — | — | — | — | — | — | 1.0 | — | — | — | — | — |
| 1,4-BD | 1.0 | 1.0 | 1.25 | 1.5 | 1.5 | 2.0 | 2.0 | 2.0 | 2.0 | 2.0 | 1.3 | 1.3 | 1.0 |
| NCO/OH | 1.02 | 1.04 | 1.04 | 1.03 | 1.07 | 1.00 | 1.03 | 1.03 | 1.02 | 1.03 | 0.98 | 1.02 | 1.0175 |
| Room temperature (73° F.) Notched Izod ⅛"** | 12.4 | 18.3 | 17.7 | 19.0 | 19.0 | 12.6 | 17.4 | 18.3 | 19.5 | 17.0 | 4.9 | 18.7 | 7.5 |
| Room temperature (73° F.) Notched Izod ¼" | 6.6 | 8.5 | 13.5 | 13.0 | 15.0 | 6.8 | 6.8 | 13.0 | 7.7 | 15.0 | 3.0 | 5.8 | 6.0 |
| −20° F. Notched Izod ⅛" | 3.2 | 3.4 | 3.6 | 3.4 | 4.3 | 2.9 | 3.6 | 3.1 | 1.2 | 1.4 | — | 1.8 | 3.0 |
| Tf(°C.) ± 5° C.**** | −70 | −70 | −67 | −65 | −65 | −62 | −62 | −70 | −38 | −42 | −50 | −48 | −70 |

*polybutylene adipate
**All Notched Izod results are in ft.-lbs/in. notch
***Elastomer M also contained 0.012 equivalent of butyl carbitol
****Estimated Tf For further comparison purposes, the above described oxymethylene copolymer (without any polyurethane modifier) has a room temperature (73° F.) Notched Izod (⅛") value of from about 1.5 and a 2.0 and a −20° F. and −40° F. Notched Izod (⅛") value of about 1.2.

EXAMPLE 2

Using the reactants and proportions set forth below a polyurethane elastomer was prepared using essentially the same procedure described in Example 1, but carrying out the reaction on a continuous one-shot basis utilizing a Werner-Pfleiderer extruder-mixer. The stabilizer-lubricant package was added with the reactants to the extruder-mixer. The polyurethane was extruded in the form of strands which were chopped into pellets. An aliquot of the pellets was injection molded in the form of a test sheet (5"×5"×0.060") which was subjected to physical testing. The physical properties so determined are set forth below.

were prepared using essentially the same one-shot continuous procedure and equipment described in Example 2. The resulting polyurethanes were then extruded in the form of strands which were chopped into pellets. An aliquot of each polyurethane was then melt blended with an aliquot of the oxymethylene copolymer described in Example 1. (A similar 72/28 weight percent blend was used). The mixing, melt blending and drying procedures were as described in Example 1. The resulting dried polyurethane-oxymethylene copolymer blend was then injection molded as described in Example 1 to form the ¼" and ⅛" thick test specimens in order to perform the Notched Izod impact test. Table 5 sets forth the impact tests results.

TABLE 4

| Polyurethane Elastomer | N | O | P |
|---|---|---|---|
| MDI | 2.58 | 2.63 | 2.68 |
| PTMG (MW 2000) | 1.0 | 1.0 | 1.0 |

TABLE 4-continued

| Polyurethane Elastomer | N | O | P |
|---|---|---|---|
| 1,4-BD | 1.5 | 1.5 | 1.5 |
| Advawax 280* | 0.25 wt. % | 0.25 wt. % | 0.25 wt. % |
| Irganox 1010* | 0.25 wt. % | 0.25 wt. % | 0.25 wt. % |
| Stannous Octoate* | 0.025 wt. % | 0.025 wt. % | 0.025 wt. % |
| NCO/OH | 1.03 | 1.05 | 1.07 |

*wt. % based on the total weight of the MDI, PTMG and 1,4-BD.

TABLE 5

| Polyurethane Elastomer | N | O | P |
|---|---|---|---|
| Oxymethylene copolymer (wt. %) | 72 | 72 | 72 |
| Polyurethane (wt. %) | 28 | 28 | 28 |
| NCO/OH | 1.03 | 1.05 | 1.07 |
| Room Temperature (73° F.) Notched Izod ⅛"* | 17.0 | 16.0 | 16.0 |
| Room Temperature (73° F.) Notched Izod ¼" | 13.5 | 12.5 | 13.5 |
| −20° F. Notched Izod ⅛" | 2.9 | 3.5 | 2.8 |

*All Notched Izod results are in ft.-lbs./in. notch.

EXAMPLE 4

For purposes of further comparison, a commercially available ester based polyurethane elastomer sold by Mobay Chemical under the designation Texin 591A was blended with the oxymethylene copolymer described in Example 1 in accordance with the same blending procedure set forth in Example 1. A blend of 30 weight percent Texin 591A with 70 weight percent oxymethylene copolymer was used. The resulting pellets were molded as described in Example 1 to form the ¼" and ⅛" thick bars for testing. The room temperature (73° F.) Notched Izod results obtained were 4.0 ft.-lbs./in. Notch for both the ¼" and ⅛" thick samples.

EXAMPLE 5

Aliquots of the polyurethane prepared as described in Example 2 were melt blended with aliquots of the oxymethylene copolymer described in Example 1. Table 6 below sets forth the weight percent of the oxymethylene copolymer and polyurethane used to prepare the blends. The mixing, melt blending and drying procedures were as described in Example 1. The resulting dried polyurethane-oxymethylene copolymer blends were then injection molded as described in Example 1 to form the ¼" and ⅛" thick test specimens in order to perform the Flexural Modulus and Notched Izod impact tests. Table 6 sets forth the impact tests results and the Flexural Modulus. The Flexural Modulus was measured in accordance with ASTM Test Method D790 using a ¼" thick specimen.

TABLE 6

| | Q | R | S | T | Delrin 100-ST* |
|---|---|---|---|---|---|
| Oxymethylene Copolymer (wt. %) | 80 | 75 | 70 | 65 | |
| Polyurethane (wt. %) | 20 | 25 | 30 | 35 | |
| Room Temperature (73° F.) Notched Izod ⅛" | 7 | 11 | 17.5 | 17 | 16 |
| Room Temperature (73° F.) Notched Izod ¼" | 4.5 | 7.5 | 13.5 | 14 | 7.5 |
| −20° F. Notched Izod ⅛" | 2.0 | 2.2 | 3.5 | 4.5 | 2.3 |
| Flexural Modulus (× 10³) | 200 | 190 | 165 | 150 | 165 |

TABLE 6-continued

| | Q | R | S | T | Delrin 100-ST* |
|---|---|---|---|---|---|
| ¼" | | | | | |

*Delrin 100-ST is a polyurethane modified oxymethylene homopolymer blend sold commercially by Dupont. About 30 to 35 weight percent polyurethane is contained in the Delrin blend.

EXAMPLE 6

Aliquots of the oxymethylene copolymer as described in Example 1 were blended with the polyurethane as described in Example 2 in the weight percent ratios shown in Table 7 below. The oxymethylene - polyurethane mixtures were dried in a vacuum oven at 80° C. overnight, extruded in a ¾" Brabender single screw extruder, pelletized, the resulting pellet blends dried again in the vacuum oven under the same conditions as described above, and then molded in a 2½ oz. Arburg injection molding machine to form 5"×½"×⅛" test bars and ASTM D-638 T-bars for Notched Izod and Tensile Modulus testing. The tensile modulus testing was done on an Instron testing machine.

TABLE 7

| Blend | 1 | 2 | 3 | 4 | 5 |
|---|---|---|---|---|---|
| Oxymethylene Copolymer (wt. %) | 90 | 80 | 70 | 60 | 50 |
| Polyurethane (wt. %) | 10 | 20 | 30 | 40 | 50 |
| Room Temperature (73° F.) Notched Izod ⅛" | 2.4 | 4.5 | NB* | NB | NB |
| −20° F. Notched Izod ⅛" | 1.4 | 1.6 | 2.4 | 7.4 | NB |
| −40° F. Notched Izod ⅛" | 1.6 | 1.3 | 1.6 | 2.4 | 7.8 |
| Tensile Modulus (× 10³ psi) | 271 | 205 | 171 | 128 | 102 |

*NB means no break, i.e., greater than about 16 ft.-lb./in. Notch.

EXAMPLE 7

Aliquots of the oxymethylene copolymer as described in Example 1 were blended with the polyurethane as described in Example 2 (Blend 3) and two comparison polyurethanes having different glass transition temperatures (Tg) (Blends 1 and 2). The copolymer and polyurethanes were dried to reduce the moisture content. The copolymer and polyurethane mixtures were then melt blended, pelletized, dried, and the resulting pellet blends molded to form ⅛" thick test specimens for Notched Izod testing. The Notched Izod test results are set forth in Table 8 below.

TABLE 8

| Blend | 1 | 2 | 3 |
|---|---|---|---|
| Oxymethylene Copolymer (wt. %) | 80 | 80 | 80 |
| Polyurethane (wt. %) | 20 | 20 | 20 |
| Tg* | −48.2° C. | −36.8° C. | −64° C. |
| Room Temperature (73° F.) Notched Izod ⅛" | 1.9 | 3.3 | 4.5 |
| −20° F. Notched Izod ⅛" | — | — | 1.6 |

*As measured by Dupont DSC 1090 Thermal Analyzer at 20° C. per minute heating rate.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

We claim:

1. An oxymethylene polymer molding composition which is capable of being molded to form articles exhibiting enhanced impact strength, comprising an intimate blend of:
   (a) from about 5 to about 50 weight percent based upon the total weight of the composition of an elastomeric polyurethane, which is the reaction product of:
   (i) 4,4'-methylenebis(phenyl isocyanate),
   (ii) polyoxytetramethylene glycol having a molecular weight within the range of about 1500 to about 3000, and
   (iii) at least one diol extender selected from the group consisting of aliphatic straight chain diols having from 2 to about 6 carbon atoms, bis(2-hydroxy-ethyl) ether of hydroquinone, and bis(2-hydroxy-ethyl) ether of resorcinol,
   said diol extender being used in the reaction within the amount of about 0.5 to about 2.5 equivalents of extender per equivalent of said polyoxytetramethylene glycol, and said phenyl isocyanate being used in the reaction in an amount such that the ratio of isocyanate groups to total hydroxyl groups is within the range of about 1.0:1.0 to about 1.08:1.0, and
   (b) from about 50 to about 95 weight percent based upon the total weight of the composition of an oxymethylene polymer.

2. An oxymethylene polymer molding composition according to claim 1 wherein the oxymethylene polymer is selected from the group consisting of:
   (i) oxymethylene homopolymer,
   (ii) oxymethylene copolymer comprising about 85 to about 99.9 percent recurring —OCH$_2$— groups interspersed with groups of the formula:

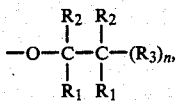

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl radical having from 1 to 2 carbon atoms, inclusive, said copolymer having a number average molecular weight of at least 10,000 and a melting point of at least 150° C., and
   (iii) oxymethylene terpolymer, which is the reaction product of trioxane, a cyclic ether and/or cyclic acetal, and a diglycide of the formula:

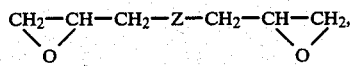

wherein Z is selected from the group consisting of a carbon-to-carbon bond, oxygen, an oxyalkoxy of 1 to 8 carbon atoms, and an oxypoly(lower alkoxy).

3. An oxymethylene polymer molding composition according to claim 1 wherein the weight percent of elastomeric polyurethane is from about 20 to about 40, and the weight percent of oxymethylene polymer is from about 60 to about 80.

4. An oxymethylene polymer molding composition according to claim 3 wherein
   (i) the polyoxytetramethylene glycol has a molecular weight within the range of about 2000 to about 2900, and
   (ii) the diol extender is an aliphatic straight chain diol having from 2 to about 6 carbon atoms.

5. An oxymethylene polymer molding composition according to claim 4 wherein the polyoxytetramethylene glycol has a molecular weight of about 2000, the diol extender is used in the reaction within the amount of about 1.2 to about 1.6 equivalents of diol extender per equivalent of polyoxytetramethylene glycol, and the phenyl isocyanate is used in the reaction in an amount such that the ratio of isocyanate groups to total hydroxyl groups is within the range of about 1.02:1.0 to about 1.07:1.0.

6. A shaped or molded article comprising the composition of claim 1.

7. An oxymethylene copolymer molding composition which is capable of being molded to form articles exhibiting enhanced impact strength, comprising an intimate blend of:
   (a) from about 5 to about 50 weight percent based upon the total weight of the composition of an elastomeric polyurethane, which is the reaction product of:
   (i) 4,4'-methylenebis(phenyl isocyanate),
   (ii) polyoxytetramethylene glycol having a molecular weight within the range of about 1500 to about 3000, and
   (iii) at least one diol extender selected from the group consisting of aliphatic straight chain diols having from 2 to about 6 carbon atoms, bis(2-hydroxy-ethyl) ether of hydroquinone, and bis(2-hydroxy-ethyl) ether of resorcinol,
   said diol extender being used in the reaction within the amount of about 0.5 to about 2.5 equivalents of extender per equivalent of said polyoxytetramethylene glycol, and said phenyl isocyanate being used in the reaction in an amount such that the ratio of isocyanate groups to total hydroxyl groups is within the range of about 1.0:1.0 to about 1.08:1.0, and
   (b) from about 50 to about 95 weight percent based upon the total weight of the composition of an oxymethylene copolymer comprising about 85 to about 99.9 percent recurring —OCH$_2$— groups interspersed with groups of the formula:

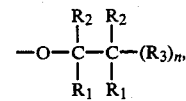

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive, each lower alkyl radical having from 1 to 2 carbon atoms, inclusive, said copolymer having a number average molecular weight of at least 10,000 and a melting point of at least 150° C.

8. An oxymethylene copolymer molding composition according to claim 7 wherein the weight percent of elastomeric polyurethane is from about 15 to about 50, and the weight percent of oxymethylene copolymer is from about 50 to about 85.

9. An oxymethylene copolymer molding composition according to claim 7 wherein the weight percent of elastomeric polyurethane is from about 20 to about 40, and the weight percent of oxymethylene copolymer is from about 60 to about 80.

10. An oxymethylene copolymer molding composition according to claim 7 wherein the polyoxytetramethylene glycol has a molecular weight within the range of about 2000 to about 2900.

11. An oxymethylene copolymer molding composition according to claim 7 wherein the diol extender is an aliphatic straight chain diol selected from the group consisting of 1,4-butanediol and 1,6-hexanediol.

12. An oxymethylene copolymer molding composition according to claim 11 wherein the polyoxytetramethylene glycol has a molecular weight of about 2000, the diol extender is used in the reaction within the amount of about 1 to about 2 equivalents of diol extender per equivalent of polyoxytetramethylene glycol, and the phenyl isocyanate is used in the reaction in an amount such that the ratio of isocyanate groups to total hydroxyl groups is within the range of about 1.02:1.0 to about 1.07:1.0.

13. An oxymethylene copolymer molding composition according to claim 7 wherein
   (i) the polyoxytetramethylene glycol has a molecular weight within the range of about 2000 to about 2900, and
   (ii) the diol extender is an aliphatic straight chain diol selected from the group consisting of 1,4-butanediol and 1,6-hexanediol.

14. An oxymethylene copolymer molding composition according to claim 13 wherein the weight percent of elastomeric polyurethane is from about 20 to about 40, and the weight percent of oxymethylene copolymer is from about 60 to about 80.

15. An oxymethylene copolymer molding composition according to claim 14 wherein said groups represented by the formula:

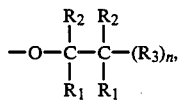

are incorporated during the step of copolymerization to produce said oxymethylene copolymer by the opening up of a ring of a cyclic ether having adjacent carbon atoms by the breaking of an oxygen-to-carbon linkage, said cyclic ether being represented by the formula:

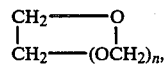

wherein n represents an integer from zero to two.

16. An oxymethylene copolymer molding composition according to claim 14 wherein said oxymethylene copolymer comprises about 98 percent recurring —$OCH_2$— groups and about 2 percent recurring —$OCH_2CH_2$— groups, said oxymethylene copolymer having a number average molecular weight of at least 10,000 and a melting point of at least 150° C., and said oxymethylene copolymer being derived from trioxane and ethylene oxide.

17. An oxymethylene copolymer molding composition according to claim 16 wherein said oxymethylene copolymer has a melt index of about 2.5g./10 min.

18. A shaped or molded article comprising the composition of claim 7.

19. An oxymethylene copolymer molding composition which is capable of being molded to form articles exhibiting enhanced impact strength, comprising an intimate blend of:
   (a) from about 20 to about 40 weight percent based upon the total weight of the composition of an elastomeric polyurethane, which is the reaction product of:
      (i) 4,4'-methylenebis (phenyl isocyanate),
      (ii) polyoxytetramethylene glycol having a molecular weight within the range of about 2000 to about 2900, and
      (iii) at least one diol extender selected from the group consisting of aliphatic straight chain diols having from 2 to about 6 carbon atoms,
   said diol extender being used in the reaction within the amount of about 1 to about 2 equivalents of diol extender per equivalent of said polyoxytetramethylene glycol, and said phenyl isocyanate being used in the reaction in an amount such that the ratio of isocyanate groups to total hydroxyl groups is within the range of about 1.03:1.0 to about 1.06:1.0, and
   (b) from about 60 to about 80 weight percent based upon the total weight of the composition of an oxymethylene copolymer comprising about 98 percent recurring —$OCH_2$— groups interspersed with about 2 percent recurring —$OCH_2CH_2$— groups, said oxymethylene copolymer having a number average molecular weight of at least 10,000, a melting point of at least 150° C., a melt index of about 2.5 g./10 min., and said oxymethylene copolymer being derived from trioxane and ethylene oxide.

20. An oxymethylene copolymer molding composition according to claim 19 wherein the aliphatic straight chain diol is 1,4-butanediol, the polyoxytetramethylene glycol has a molecular weight of about 2000, and the diol extender is used in the reaction within the amount of about 1.2 to about 1.6 equivalents of diol extender per equivalent of said polyoxytetramethylene glycol.

21. An oxymethylene polymer molding composition according to claim 1 wherein said diol extender is used in the reaction within the amount of about 1.0 to about 2.0 equivalents of extender per equivalent of said polyoxytetramethylene glycol.

* * * * *